(12) United States Patent
Tsuruta

(10) Patent No.: US 7,306,021 B2
(45) Date of Patent: Dec. 11, 2007

(54) PNEUMATIC RADIAL TIRE WITH BELT REINFORCING LAYER BETWEEN CARCASS LAYER AND BELT LAYER

(75) Inventor: Makoto Tsuruta, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/496,138

(22) PCT Filed: Nov. 14, 2002

(86) PCT No.: PCT/JP02/11896

§ 371 (c)(1),
(2), (4) Date: May 20, 2004

(87) PCT Pub. No.: WO03/043837

PCT Pub. Date: May 30, 2003

(65) Prior Publication Data

US 2005/0000617 A1    Jan. 6, 2005

(30) Foreign Application Priority Data

Nov. 20, 2001 (JP) .............................. 2001-354119

(51) Int. Cl.
*B60C 9/22* (2006.01)
*B60C 9/18* (2006.01)
*B60C 9/28* (2006.01)

(52) U.S. Cl. ...................... 152/531; 152/532; 152/533; 152/538

(58) Field of Classification Search ................ 152/531, 152/532, 533, 538
See application file for complete search history.

(56) References Cited

U.S. PATENT DOCUMENTS

| 4,635,696 | A |   | 1/1987 | Gasowski et al. |
|---|---|---|---|---|
| 4,934,429 | A |   | 6/1990 | Koseki et al. |
| 5,383,507 | A | * | 1/1995 | Sato et al. ............. 152/531 X |
| 5,746,853 | A | * | 5/1998 | Burlacot ..................... 152/531 |
| 5,779,828 | A |   | 7/1998 | Okamoto |
| 5,804,644 | A |   | 9/1998 | Nakafutami et al. |
| 5,879,483 | A | * | 3/1999 | Gerresheim et al. .... 152/532 X |
| 6,145,560 | A |   | 11/2000 | Yamada et al. |
| 6,491,077 | B1 | * | 12/2002 | Lopez et al. ............ 152/531 X |
| 6,609,551 | B2 | * | 8/2003 | Clauzade et al. ....... 152/531 X |
| 2001/0017179 | A1 | * | 8/2001 | Tsuruta ....................... 152/531 |

FOREIGN PATENT DOCUMENTS

CN    1156467 A    8/1997

(Continued)

*Primary Examiner*—Adrienne C. Johnstone
(74) *Attorney, Agent, or Firm*—Sughrue Mion, PLLC

(57) ABSTRACT

A belt durability is improved by effectively suppressing an interlayer separation between each widthwise outer end portion of a belt reinforcing layer 41 and a belt layer 34, in which each widthwise outer end 45 of one widest-width inner belt ply 35a is located outward from each widthwise outer end 46 of widest-width reinforcing plies 42a, 42b in the widthwise direction and hence reinforcing elements of the belt plies are not crossed with each other at the outside from the each widthwise outer end 46 in the widthwise direction. Therefore, the each widthwise outer end portion of the inner belt ply 35a is easily reduced in the widthwise direction, whereby shearing deformation in section to the each widthwise outer end portion of the reinforcing ply 42a, 42b is reduced.

13 Claims, 6 Drawing Sheets

FOREIGN PATENT DOCUMENTS

| | | |
|---|---|---|
| EP | 0 106 788 A2 | 4/1984 |
| EP | 384558 A1 | 8/1990 |
| EP | 0 414 892 A1 | 3/1991 |
| EP | 0 785 095 A1 | 7/1997 |
| EP | 0 941 873 A2 | 9/1999 |
| FR | 2 622 844 A1 | 12/1989 |
| JP | 59-84606 A | 5/1984 |
| JP | 1-122704 A | 5/1989 |
| JP | 1-122705 A | 5/1989 |
| JP | 2-208101 A | 8/1990 |
| JP | 2-234805 A | 9/1990 |
| JP | 2-234807 A | 9/1990 |
| JP | 9-263108 A | 10/1997 |
| JP | 11-321294 A | 11/1999 |
| JP | 2000-264014 A | 9/2000 |
| JP | 2001-121916 A | 5/2001 |
| WO | WO 90/10548 A1 | 9/1990 |
| WO | WO-99/58352 A1 * | 11/1999 |

* cited by examiner

PNEUMATIC RADIAL TIRE WITH BELT REINFORCING LAYER BETWEEN CARCASS LAYER AND BELT LAYER

TECHNICAL FIELD

This invention relates to a pneumatic radial tire wherein a belt reinforcing layer(s) embedded with reinforcing elements extending substantially in a circumferential direction is arranged between a carcass layer and a belt layer, and proposes a technique of suppressing interlayer separation between a widthwise outer end portion of the belt reinforcing layer and the belt layer.

BACKGROUND ART

Recently, the pneumatic radial tire is increasingly flattened in accordance with the speeding-up floor-lowering of vehicles, whereby it is tended to increase a radially size growth quantity of a tread portion through the filling of an internal pressure. Such an increase of the radially size growth quantity produces a separation failure at both widthwise end portions of a belt layer to deteriorate a belt durability. In order to suppress the size growth in the tread portion, particularly in the vicinity of a shoulder portion through the filling of the internal pressure, a tire wherein the belt layer is reinforced with a belt reinforcing layer embedded with reinforcing elements extending in a circumferential direction has been proposed, for example, in JP-A-2-208101.

As shown in FIG. 1, this tire comprises a belt layer 114 arranged around a carcass layer 111 in a tread portion 112 and comprised of, for example, two cross belt plies 113a, 113b embedding many reinforcing elements therein crossed with each other with respect to an equatorial plane S of a tire at an inclination angle of 10-40 degrees with respect to the equatorial plane S, and a belt reinforcing layer 116 arranged between the belt layer 114 and the carcass layer 111 and comprised of at least one reinforcing ply embedded with reinforcing elements extending along the equatorial plane S and having a width narrower than that of the widest-width belt ply 113a, two reinforcing plies 115a, 115b in the figure.

As the flattening of the tire is further promoted to become an aspect ratio of not more than 0.70, the above side growth can not be effectively suppressed by the belt reinforcing layer 116 having such a conventional width. For this end, it has been proposed to suppress the side growth by widening the width of the widest-width reinforcing ply in the belt reinforcing layer 116 to not less than 0.6 times a section width W of the tire while rendering into less than the width of the widest-width belt ply 113a. In the latter tire, however, there is caused a problem that an interlayer separation is produced between each widthwise outer end portion of the belt reinforcing layer and the belt layer to deteriorate the belt durability.

Now, the inventor has made various studies with respect to the aforementioned interlayer separation and found that interlayer shearing deformation is a cause of producing the interlayer separation. That is, the belt layer 114 and the belt reinforcing layer 116 in a ground contact region are deformed from an arc shape to a flat shape during the contacting of the tire with ground viewing from a side face of the tire, and as a result, the elongation in the circumferential direction is produced in both the layers and the widths of the belt layer 114 and the belt reinforcing layer 116 are reduced by such an elongation. Since the reinforcing elements embedded in the belt reinforcing layer 116 extend substantially in the circumferential direction, the widthwise rigidity of the layer is approximately equal to the rigidity of rubber itself, and as a result, when the elements elongate in the circumferential direction as mentioned above, the belt reinforcing layer 116 is largely reduced in the widthwise direction.

On the contrary, since the reinforcing elements embedded in the belt plies 113a, 113b of the belt layer 114 are crossed with each other with respect to the equatorial plane S of the tire, these reinforcing elements are bridged to render the widthwise rigidity of the belt layer 114 into a higher value. Therefore, when the layer is elongated in the circumferential direction as previously mentioned, the widthwise reducing quantity of the belt layer 114 takes a value fairly smaller than that of the belt reinforcing layer 116, and as a result, the shearing deformation is produced between the belt layer 114 and the belt reinforcing layer 116 in the widthwise section of the tread portion.

DISCLOSURE OF THE INVENTION

The invention is based on the above knowledge and lies in a pneumatic radial tire comprising a carcass layer toroidally extending between a pair of bead portions, a belt layer arranged on a radially outer side of the carcass layer and comprised of at least two belt plies embedded with reinforcing elements inclining in opposite directions with respect to an equator of the tire, and a belt reinforcing layer arranged between the carcass layer and the belt layer and comprised of at least one reinforcing ply embedded with reinforcing elements extending substantially in a circumferential direction, provided that a width Wp of a widest-width reinforcing ply among the reinforcing plies is 0.6 times or more a tire width W, in which only a widest-width belt ply among the belt plies is arranged so as to locate each widthwise outer end thereof outward from each widthwise outer end of the widest-width reinforcing ply in the widthwise direction.

When only the widest-width belt ply among the belt plies is arranged so as to locate each widthwise outer end thereof outward from each widthwise outer end of the widest-width reinforcing ply in the widthwise direction as defined in the invention, the ply located outward from each widthwise outer end of the widest-width reinforcing ply is only one widest-width belt ply, so that the reinforcing elements in the portion of the belt ply at this location (the widthwise outer end portion of the widest-width belt ply) do not cross with the other reinforcing elements.

For this end, both the widthwise outer end portions of the widest-width belt ply become easily reduced in the widthwise direction, and the shearing deformation quantity in the widthwise section of the tire between the each widthwise outer end of the widest-width reinforcing ply and the belt layer is reduced to effectively suppress the interlayer separation between the each widthwise outer end portion of the belt reinforcing layer and the belt layer to thereby improve the belt durability.

In this case, when the inclination angle of the reinforcing element embedded in the belt ply with respect to the equator of the tire is within a range of 40-60 degrees in all belt plies, the displacement in the circumferential direction between the belt layer and the belt reinforcing layer can be made small at a position separated from a ground contact region at a given angle (about 60 degrees) or at a position of particularly increasing the bulging deformation or the like of the tread portion viewing from a side face of the tire while maintaining the hoop effect of the belt layer.

Also, when the width of the remaining belt ply(s) having a width narrower than that of the widest-width belt ply is within a range of 0.2-0.8 times the width of the widest-width belt reinforcing ply, the shearing deformation between the each widthwise outer end portion of the widest-width reinforcing ply and the belt layer in the section can be effectively reduced while ensuring the envelop characteristic in the vicinity of the equator of the tire.

Further, when a cushion rubber layer is interposed at least between the each widthwise outer end portion of the widest-width reinforcing ply and a portion of the belt ply overlapped therewith, the rubber gauge between the widthwise outer end portion of the widest-width reinforcing ply and the belt ply becomes thicker, and as a result, the shearing stress can be largely reduced by the dispersion of the interlayer shearing strain into the cushion rubber layer in addition to the aforementioned reduction of the shearing strain therebetween and the interlayer separation can be more effectively suppressed.

When a total gauge of coating rubbers mutually opposed to each other in the mutually adjoining reinforcing ply and belt ply is T, a rubber gauge G including the total gauge T between the each widthwise outer end portion of the widest-width reinforcing ply and the portion of the belt ply overlapped therewith including the cushion rubber layer interposed therebetween is rendered into a range of 2-10 times the total gauge T, whereby the shearing stress can be further effectively reduced while preventing problems in the production such as air blister and the like.

When the cushion rubber layer is made of rubber having a JIS hardness equal to or less than the JIS hardness of the coating rubber for the belt ply, the shearing strain between the each widthwise outer end portion of the widest-width reinforcing ply and the belt ply can be effectively reduced.

In this case, when the cushion rubber layer is made of rubber having a JIS hardness of 55-80, the shearing stress can be effectively reduced while preventing the breakage of the cushion rubber layer itself.

Moreover, when the widthwise outer end of the cushion rubber layer is located inward from the each widthwise outer end of the widest-width belt ply in the widthwise direction, the shearing stress can be effectively reduced while suppressing the occurrence of separation at the each widthwise outer end of the widest-width belt ply.

When a lateral rubber layer made of rubber having a JIS hardness equal to or more than the JIS hardness of the coating rubber for the reinforcing ply is arranged at each widthwise outside of the widest-width reinforcing ply, the occurrence of separation can be suppressed beside the each widthwise outer end of the widest-width reinforcing ply.

In this case, when the widthwise outer end of the lateral rubber layer is extended outward from the widthwise outer end of the widest-width belt ply in the widthwise direction, both the separation failure beside the each widthwise outer end of the widest-width reinforcing ply and the separation failure at the each widthwise outer end of the widest-width belt ply can be effectively suppressed.

When the lateral rubber layer is made of rubber having a JIS hardness higher than that of the cushion rubber layer, at least the separation failure beside the each widthwise outer end of the widest-width reinforcing ply, and in some cases the separation failure at the each widthwise outer end of the widest-width belt ply can be suppressed effectively.

When the widest-width belt ply is arranged adjacent to the belt reinforcing layer, the remaining belt ply(s) having a width narrower than that of the widest-width belt ply is arranged outside the widest-width belt ply in the radial direction, so that the tire building becomes easy.

Furthermore, when at least one belt ply is arranged between the widest-width belt ply and the belt reinforcing layer, the rubber gauge between the each widthwise outer end portion of the widest-width reinforcing ply and a portion of the belt ply overlapped therewith can be easily thickened.

BEST MODE FOR CARRYING OUT THE INVENTION

Figure 2:
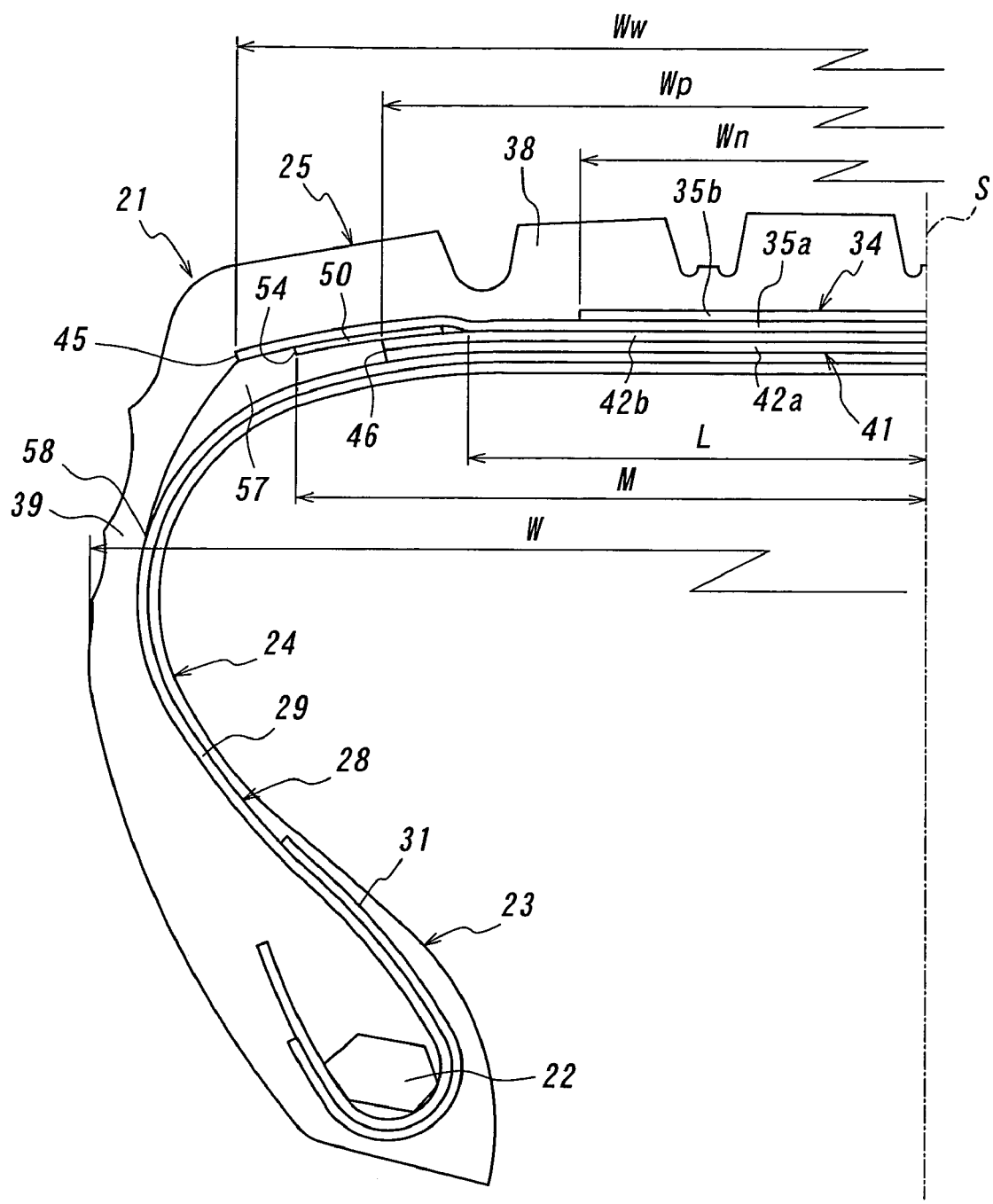
FIG. 2 is a meridional half-section view illustrating an embodiment of the tire according to the invention.
Figure 3:
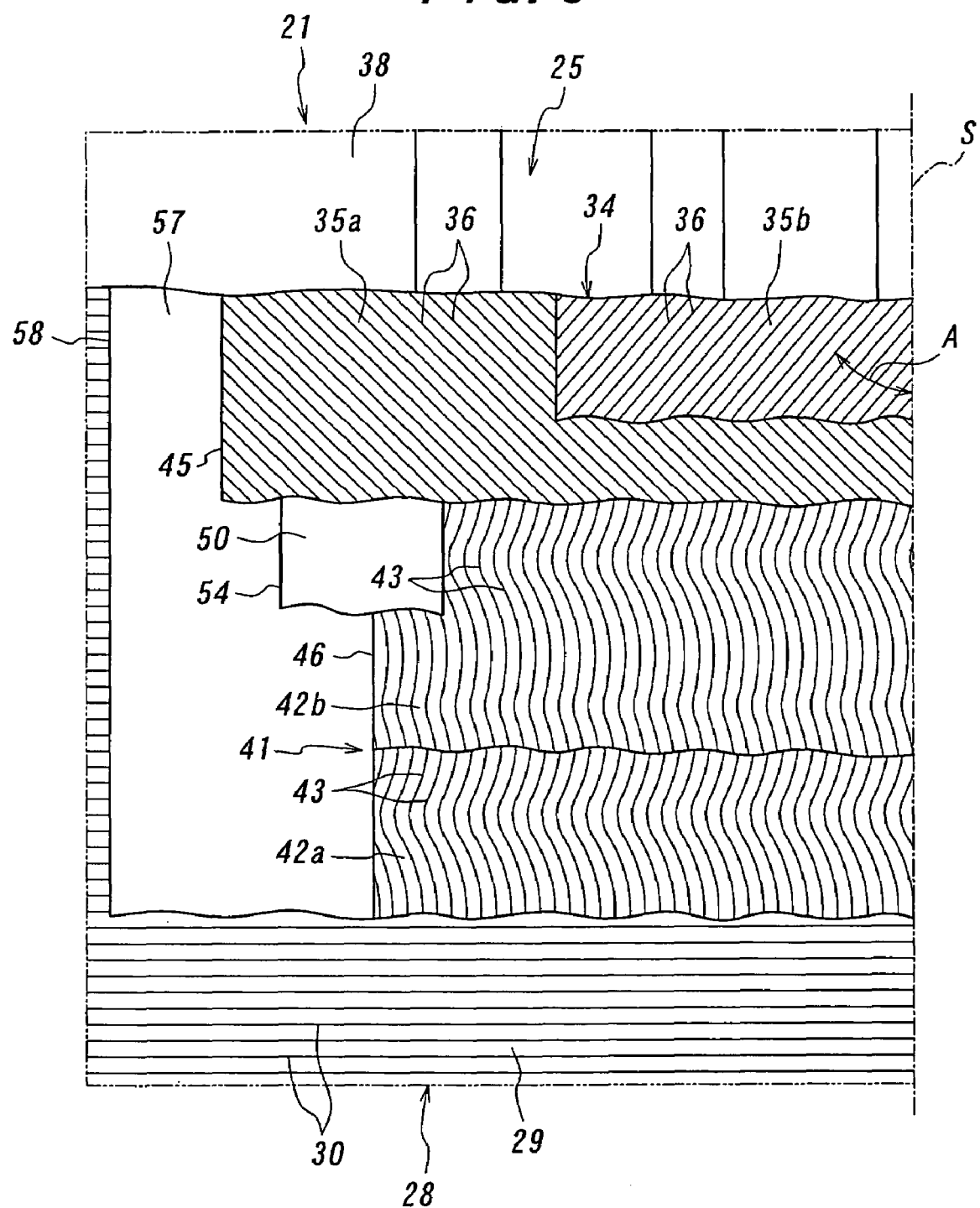
FIG. 3 is a plan view partly shown in section of a tread portion.

In FIGS. 2 and 3 showing one embodiment of the invention, numeral 21 is a heavy duty pneumatic radial tire having an aspect ratio of not more than 0.70 to be mounted on a truck, bus or the like. This tire 21 comprises a pair of bead portions 23 and bead cores 22 constituting a pair (one pair in the illustrated embodiment, but plural pairs may be taken) are embedded in these bead portions 23. Also, the tire 21 comprises sidewall portions 24 substantially extending outward from these bead portions 23 in a radial direction, respectively, and a tread portion 25 of substantially a cylindrical form connecting radially outer ends of the sidewall portions 24 to each other.

Further, the tire 21 comprises a carcass layer 28 toroidally extending between the bead cores 22 to reinforce the sidewall portions 24 and the tread portion 25, in which both end portions of the carcass layer 28 are wound around the respective bead cores 22 from an axially inside toward an axially outside. The carcass layer 28 is comprised of at least one ply, one carcass ply 29 in the illustrated embodiment, in which many inextensible reinforcing elements 30 extending substantially in a radial direction (meridional direction), for example, steel cords are embedded in the inside of the carcass ply 29. Also, a chafer 31 reinforced with, for example, steel cords is arranged around the carcass layer 28 in the bead portion 23.

Figure 4:
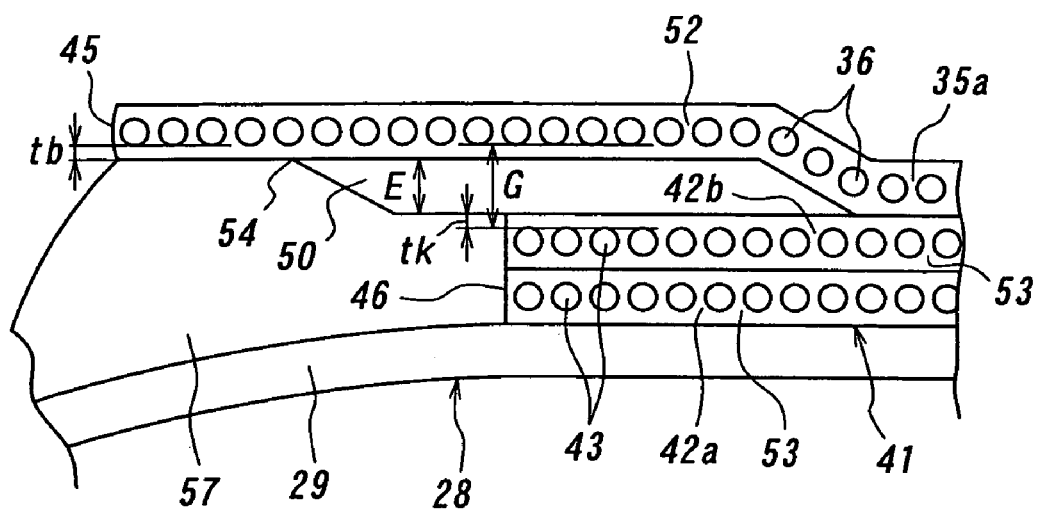
FIG. 4 is an enlarged meridional section view in the vicinity of a cushion rubber layer.

In FIGS. 2, 3 and 4, numeral 34 is a belt layer arranged on an outside of the carcass layer 28 in the radial direction. This belt layer 34 is comprised of at least two (two in the illustrated embodiment) belt plies 35a, 35b, in which many inextensible reinforcing elements 36 made from, for example, steel or aramid fiber are embedded in the interior of each of the belt plies 35a, 35b. The reinforcing elements 36 embedded in these belt plies 35a, 35b are inclined with respect to an equator S of the tire, and the inclining directions thereof are opposite to each other in at least two belt plies 35a, 35b.

Among these belt plies 35, a width of an inner belt ply 35a is wider than that of an outer belt ply 35b. As a result, the inner belt ply 35a is a widest-width belt ply in the illustrated embodiment, and a width thereof is Ww. Moreover, numeral 38 is a top tread arranged at outsides of the carcass layer 28 and the belt layer 34 in the radial direction, and numeral 39 is a side tread arranged at both outsides of the carcass layer 28 in an axial direction.

Numeral 41 is a belt reinforcing layer arranged between the carcass layer 28 and the belt layer 34 so as to overlap with the belt layer 34. The belt reinforcing layer 41 is comprised of at least one ply, two laminated reinforcing plies 42a, 42b in the illustrated embodiment. In each interior of the reinforcing plies 42a, 42b are embedded reinforcing elements 43 each extending substantially in the circumferential direction and made of steel, aramid fiber or the like, in which the reinforcing element 43 is constructed with a cord (twisted wire) or a monofilament and plural number of the elements are appeared in the meridional section of each of the reinforcing plies 42a, 42b. Although the reinforcing element 43 is bent in a wavy form (zigzag) in the illustrated embodiment, it may be extended straightforward in the circumferential direction.

Each of the reinforcing plies 42a, 42b may be constructed by spirally winding a ribbon-shaped body, which is obtained by placing, for example, small number of the reinforcing elements 43 side by side and covering with rubber, on the outside of the carcass layer 28 many times. Also, a widest-width reinforcing ply among these reinforcing plies (in the illustrated embodiment, inner and outer reinforcing plies 42a, 42b have equal width, so that both the reinforcing plies 42a, 42b make the widest-width reinforcing plies) has a width Wp corresponding to not less than 0.6 times a tire width W, and 0.66 times in the illustrated embodiment. When the width Wp of the widest-width reinforcing ply 42a, 42b is not less than 0.6 times the tire width W, the size growth of the tire 21 having an aspect ratio of not more than 0.70 through the filling of an internal pressure as previously mentioned is effectively suppressed.

However, when the width Wp of the widest-width reinforcing ply 42a, 42b is widened to not less than 0.6 times the tire width W, since the width reducing quantity based on the elongation in the circumferential direction during the contacting with ground differs between the belt layer 34 and the belt reinforcing layer 41, the shearing deformation is caused between these layers in the widthwise section of the tire, whereby the interlayer separation is produced between the each widthwise outer end portion of the belt reinforcing layer 41 and the belt layer 34.

In the embodiment of the invention, therefore, only the one widest-width inner belt ply 35a is arranged so as to locate the each widthwise outer end 45 thereof outward from each widthwise outer end of the widest-width reinforcing plies 42a, 42b in the widthwise direction; that is, only the widest-width inner belt ply 35a is widened to the widest-width reinforcing plies 42a, 42b, whereby the each widthwise outer end 45 of the inner belt ply 35a is extended outward from the each widthwise outer ends 46 of the reinforcing plies 42a, 42b in the widthwise direction.

As a result, only the widest-width inner belt ply 35a, that is, the widthwise outer end portion of the inner belt ply 35a is positioned in a region outside the each widthwise outer ends of the widest-width reinforcing plies 42a, 42b in the widthwise direction, so that the reinforcing elements 36 of the belt plies 35a, 35b are not crossed with each other in this region.

For this end, the each widthwise outer end portion of the widest-width inner belt ply 35a becomes easily diminished and hence the shearing deformation is reduced in the widthwise section of the tread portion between the each widthwise outer ends 46 of the widest-width reinforcing plies 42a, 42b and the belt layer 34, the adjoining inner belt ply 35a in the illustrated embodiment, whereby the interlayer separation between the each widthwise outer end portion of the belt reinforcing layer 41 and the belt layer 34 is effectively suppressed to improve the belt durability.

Here, when the widest-width belt ply (inner belt ply 35a) is arranged adjacent and close to the belt reinforcing layer 41 in the belt layer at an innermost side in the radial direction, all of the remaining belt plies (outer belt ply 35b) having a narrower width are arranged on the outside of the inner belt ply 35a in the radial direction, so that the building of the tire 21 becomes easier.

In this case, it is preferable that a width Wn of all remaining belt plies having a width narrower than that of the widest-width inner belt ply 35a, a width of the outer belt ply in the illustrated embodiment is within a range of 0.2-0.8 times the width Wp of the widest-width reinforcing ply 42a, 42b. Although an input from a projection becomes severest in the vicinity of the equatorial plane S of the tire, when the width Wn is not less than 0.2 times the width Wp as mentioned above, two or more belt plies are piled one upon the other at this region, whereby the envelop characteristic in the vicinity of the equatorial plane S can be ensured.

On the other hand, when the width Wn exceeds 0.8 times the width Wp, the influence of the width-reducing limit through the remaining belt ply having a narrow width (outer belt ply 35b) exerts on the each widthwise outer ends 46 of the widest-width reinforcing plies 42a, 42b, so that there is a fear that the shearing deformation in the section between the belt layer 34 and the belt reinforcing layer 41 becomes large. However, when it is not more than 0.8 times as mentioned above, such a sharing deformation in the section can be reduced effectively.

Also, the inclination angle A of the reinforcing element 36 embedded in the belt plies 35a, 35b with respect to the equator S of the tire is usually within a range of 10-40 degrees. In the invention, however, it is preferable to be within a range of 40-60 degrees even in the belt plies 35a, 35b. Because, when the inclination angle A is not less than 40 degrees, the displacement in the circumferential direction between the belt layer 34 and the belt reinforcing layer 41 at a position separated from the ground contact region at a given angle (about 60 degrees) can be made small. However, when the inclination angle A exceeds 60 degrees, the shearing rigidity of the belt layer 34 under loading may become large, so that it is preferable to be not more than 60 degrees as previously mentioned.

When only the each widthwise outer end 45 of the widest-width inner belt ply 35a is located outward from the each widthwise outer ends 46 of the widest-width reinforcing plies 42a, 42b in the widthwise direction, it is preferable that a cushion rubber layer 50 having a rubber gauge E (mm) is interposed between the each widthwise outer end portion of the reinforcing ply 42a, 42b, the outer reinforcing ply 42b in the illustrated embodiment, and the portion of the belt ply 35a, 35b overlapped therewith, the inner belt ply 35a adjacent and close to the outer reinforcing ply 42b in the illustrated embodiment.

Because, when the cushion rubber layer 50 is interposed at this position, the rubber gauge between the each widthwise outer end portion of the reinforcing ply 42b producing the aforementioned shearing deformation in the section and the inner belt ply 35a adjacent thereto becomes thick and hence the shearing strain therebetween can be dispersed by the deformation of the cushion rubber layer 50 to reduce the shearing stress.

By interposing the cushion rubber layer 50 as mentioned above is made large a rubber gauge G between the each widthwise outer end portion of the widest-width reinforcing ply 42b and the portion of the inner belt ply 35a overlapped therewith, which includes coating rubber gauges of opposite faces of both the plies. The value of the rubber gauge G is preferable to be within a range of 2-10 times a total gauge T in connection with a total of coating rubber gauges T=tb+tk when gauges of mutually opposite faces of coating rubbers 52 and 53 of the belt ply 35a and the reinforcing ply 42b are tb and tk, respectively.

When the rubber gauge G is not less than 2 times the total gauge T, the shearing stress between the each widthwise outer end portion of the widest-width outer reinforcing ply 42b and the inner belt ply 35a can be reduced effectively, while when it exceeds 10 times, the effect of reducing the above shearing stress is saturated and there is caused a problem in the production such as air blister or the like.

In general, the JIS hardness of the coating rubber 52 for the belt plies 35a, 35b is made higher than that of the coating rubber 53 for the reinforcing plies 42a, 42b. Therefore, the JIS hardness H of rubber constituting the cushion rubber layer 50 is preferable to be not more than the JIS hardness of the coating rubber 52 for the belt plies 35a, 35b indicating the higher one. Because, the shearing stress can be effectively reduced owing to the presence of the cushion rubber layer 50 capable of dispersing and absorbing the shearing strain between the each widthwise outer end portion of the widest-width reinforcing plies 42a, 42b and the inner belt ply 35a.

Further, it is preferable that when the value of the JIS hardness H of the rubber constituting the cushion rubber layer 50 is lower than (less than) the JIS hardness of the coating rubber 52 for the belt plies 35a, 35b, the shearing strain can be advantageously dispersed and absorbed. The term "JIS hardness" used herein means a hardness of rubber measured at a temperature of 30° C. using a type A durometer hardness testing machine according to JIS K6253-1993.

As the JIS hardness H of the rubber constituting the cushion rubber layer 50 becomes lower, the shearing strain can be effectively dispersed and absorbed to prevent the concentration of the strain in the coating rubbers 52, 53, so that the JIS hardness H of the cushion rubber layer 50 is preferable to be not more than 80 degrees. However, when the JIS hardness H of the cushion rubber layer 50 is less than 55 degrees, there is a fear that the cushion rubber layer 50 itself is broken by the deformation during the running under loading, so that the hardness is preferable to be within a range of 55-80 degrees as mentioned above.

Further, it is preferable that the widthwise outer end of the cushion rubber layer 50 is located inward from the each widthwise outer end 45 of the widest-width inner belt ply 35a in the widthwise direction. Because, the top tread 38 is compressed in the ground contact region and deformed so as to expand outward in the widthwise direction, so that if the cushion rubber layer 50 having a relatively low hardness as mentioned above is extended outward over the each widthwise outer end 45 of the inner belt ply 35a in the widthwise direction, the rigidity of the top tread 38 is lowered by the influence of the cushion rubber layer 50 to promote the above deformation, and as a result, there is caused a fear of creating separation failure at the each widthwise outer end 45 of the widest-width inner belt ply 35a.

In the embodiment of the invention, a lateral rubber layer 57 made of rubber having a JIS hardness J higher than the JIS hardness of the coating rubber 53 for the reinforcing plies 42a, 42b is further disposed at each outside of the widest-width reinforcing plies 42a, 42b in the widthwise direction (right and left sides) in addition to the above cushion rubber layer 50. Thus, when the lateral rubber layer 57 having the hardness higher than that of the coating rubber 53 for the reinforcing plies 42a, 42b is disposed at each outside of the reinforcing plies 42a, 42b in the widthwise direction (right and left sides), strain beside the widthwise outer ends 46 of the reinforcing plies 42a, 42b can be suppressed to control the occurrence of separation failure at this position.

Further, when the widthwise outer end 58 of the lateral rubber layer 57 is extended outward over the widthwise outer end 45 of the widest-width inner belt ply 35a in the widthwise direction, strain beside the widthwise outer end 45 of the widest-width inner belt ply 35a can also be suppressed, whereby the occurrence of separation failure at the widthwise outer end 45 of the widest-width inner belt ply 35a in addition to the lateral side of the widthwise outer ends 46 of the reinforcing plies 42a, 42b can be controlled.

In this case, the JIS hardness J of the rubber constituting the lateral rubber layer 57 is preferable to be made higher than the JIS hardness H of the rubber constituting the cushion rubber layer 50. In this way, at least the separation failure beside the widthwise outer ends 46 of the reinforcing plies 42a, 42b, and in some cases the separation failure at the widthwise outer end 45 of the widest-width belt ply 35a can be suppressed strongly.

Figure 5:
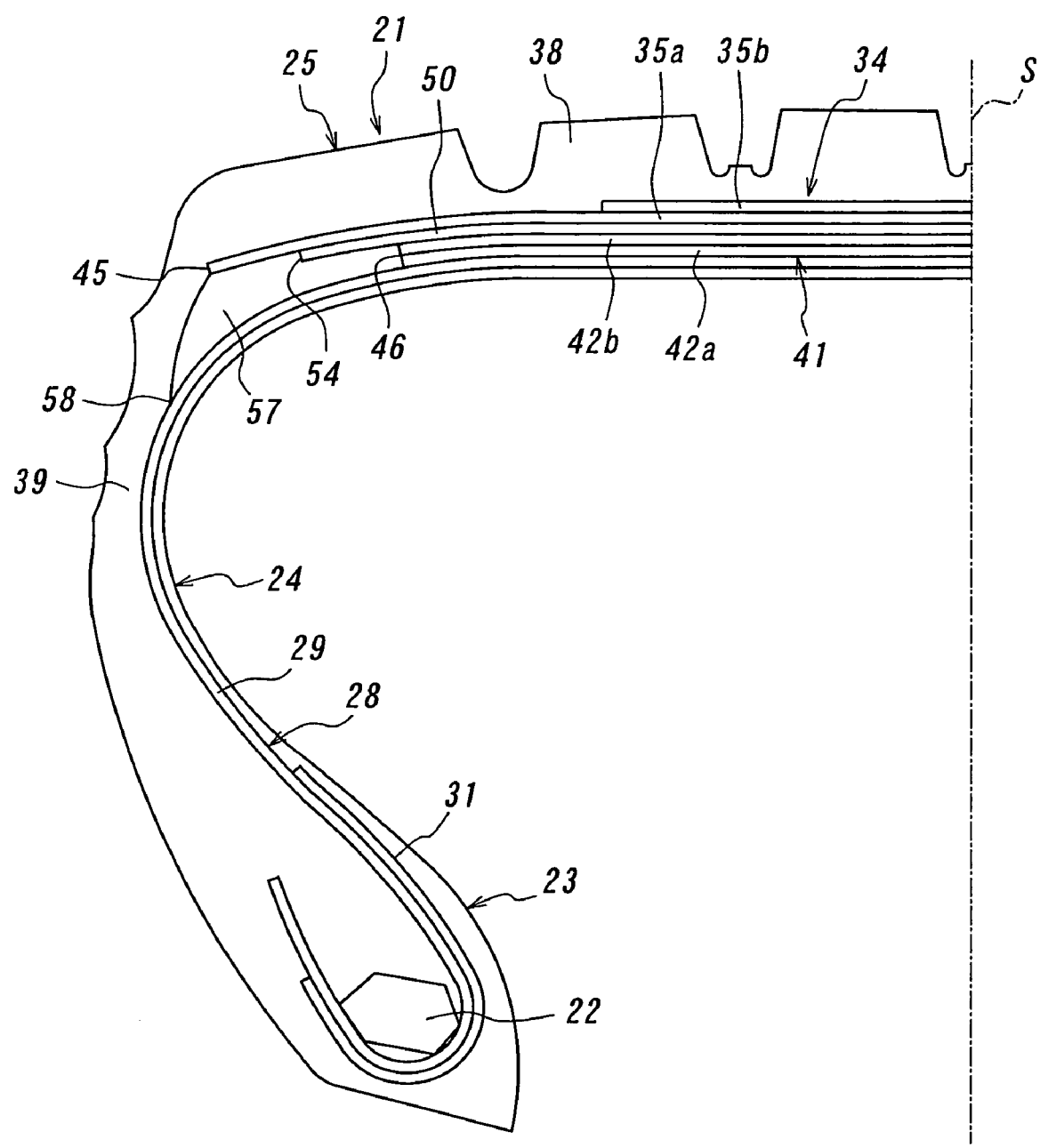
FIG. 5 is a meridional half-section view illustrating another embodiment of the tire according to the invention.

FIG. 5 is a view illustrating the second embodiment of the invention. In this embodiment, the cushion rubber layer 50 is arranged over a full region ranging from a widthwise one side end portion of the outer reinforcing ply 42b to the other side end portion thereof through the equator S of the tire. In this way, it is enough to supply one rubber sheet onto a building drum in the building of the tire 21, so that the building operation of the tire 21 becomes easy.

Figure 6:
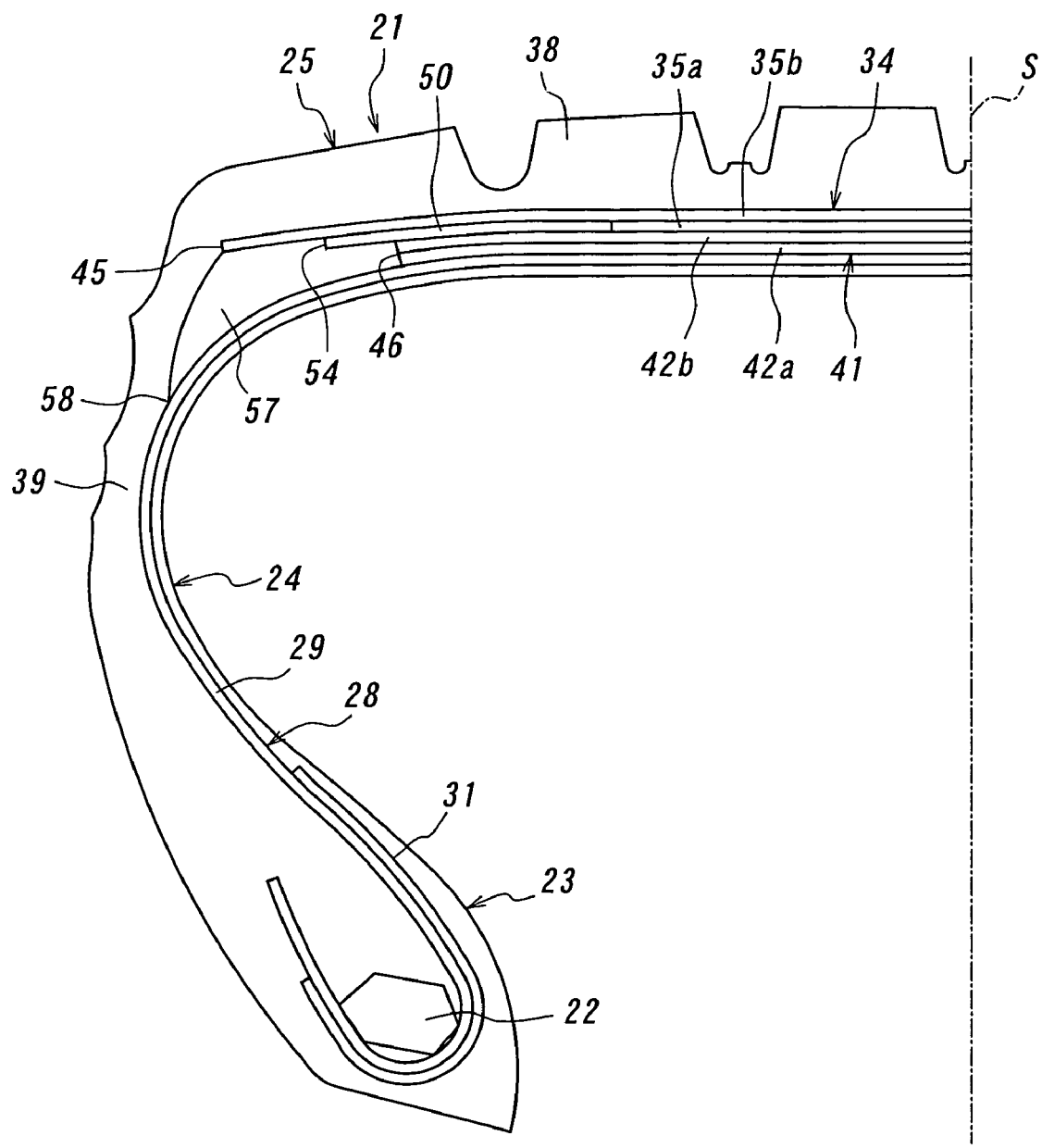
FIG. 6 is a meridional half-section view illustrating the other embodiment of the tire according to the invention.

FIG. 6 is a view illustrating the third embodiment of the invention. In this embodiment, the widest-width belt ply is not the inner belt ply 35a adjacent and close to the belt reinforcing layer 41, but is an outer belt ply 35b when at least one belt ply (inner belt ply 35a) is arranged with the belt reinforcing layer 41. In this way, the rubber gauge between the each widthwise outer end portion of the widest-width reinforcing ply 42a, 42b and the portion of the widest-width belt ply (outer belt ply 35b) overlapped therewith can be easily thickened.

EXAMPLE

Figure 1:
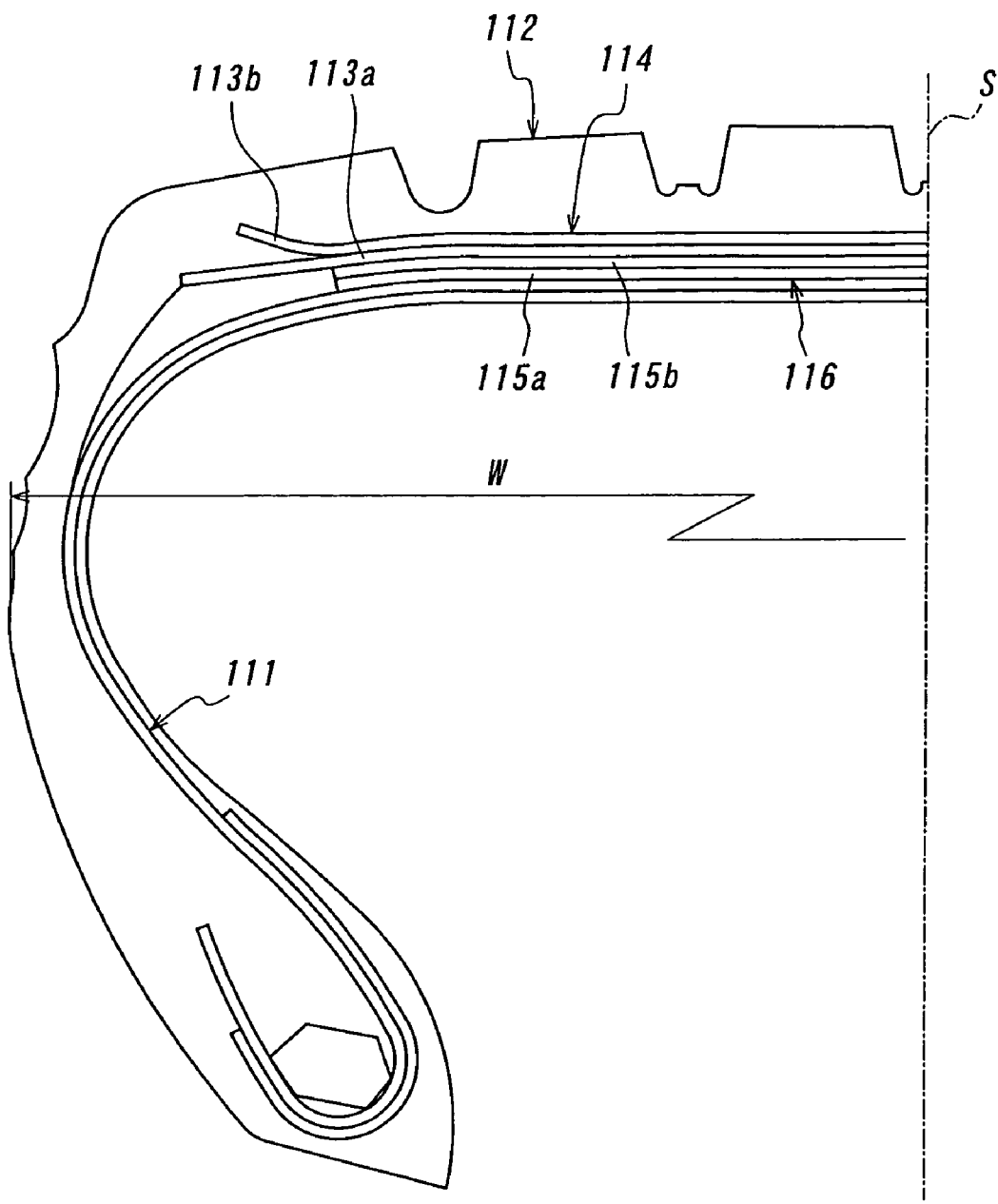
FIG. 1 is a meridional half-section view illustrating an embodiment of the conventional tire.

A test example will be described below. In this test, there are provided a conventional tire in which the widths of all reinforcing plies constituting the belt reinforcing layer are narrower than that of the belt layer as shown in FIG. 1, a tire of Example 1 in which only the width of the inner belt ply is wider than that of the belt reinforcing layer and the cushion rubber layer is not arranged therebetween, a tire of Example 2 in which only the width of the inner belt ply is wider than that of the belt reinforcing layer and the cushion rubber layer is arranged therebetween as shown in FIG. 2, a tire of Example 3 in which only the width of the inner belt ply is wider than that of the belt reinforcing layer and the cushion rubber layer is arranged therebetween over a full region as shown in FIG. 5, tires of Examples 4, 5, 6 in which only the width of the inner belt ply is wider than that of the belt reinforcing layer and the cushion rubber layer having a different rubber gauge and hardness is arranged between the end portions thereof as shown in FIG. 6, a tire of Example 7 in which the width of the belt reinforcing layer, width of the widest-width belt ply and outer end position of the cushion rubber layer are different from those of the tire of Example 4, tires of Examples 8, 9, 10 in which only the width of the other belt ply (outer belt ply) having a width narrower than that of the widest-width belt ply is different from that of the tire of Example 2, tires of Examples 11, 12, 13 in which only the hardness of the cushion rubber layer is different from that of the tire of Example 2, a tire of Example 14 in which only the hardness of the lateral rubber layer is different from that of the tire of Example 2, tires of Examples 15, 16, 17 in which only the gauge of the cushion rubber layer is different from that of the tire of Example 4, and tires of Examples 18, 19, 20, 21 in which only the inclination angle of the reinforcing element embedded in the belt ply with respect to the equator of the tire is different from that of the tire of Example 2.

In this case, each of these tires has a tire size of 285/60R22.5, a tire width W of 290 mm, a coating rubber gauge for the reinforcing ply of 0.35 mm, a coating rubber gauge for the belt ply of 0.30 mm, a total gauge T of these coating rubbers of 0.65 mm, a JIS hardness of the coating rubber for the reinforcing ply of 70, and a JIS hardness of the coating rubber for the belt ply of 76.

The other dimensions are shown in Tables 1 and 2. In these tables, the width Wp is a width of the widest-width reinforcing ply (mm), and the belt ply width is a width of an inner belt ply (mm) at a left side of a slash and a width of an outer belt ply (mm) at a right side of the slash, and the inclination angle a is an inclination angle (degree) of a reinforcing element in the outer belt ply with respect to the equatorial plane of the tire at a left side of a slash and an inclination angle (degree) of a reinforcing element in the inner belt ply with respect to the equatorial plane at a right side of the slash, and the gauge E is a gauge of the cushion rubber layer (mm), and the gauge ratio G/T is a value of dividing the rubber gauge G between ply cords between the each widthwise outer end portion of the widest-width reinforcing ply and the portion of the belt ply overlapped therewith by the total gauge T, and the hardness H is a JIS hardness of rubber constituting the cushion rubber layer, and the distance L is a distance from the tire equator to the widthwise inner end of the cushion rubber layer (mm), and the distance M is a distance from the tire equator to the widthwise outer end of the cushion rubber layer (mm), and the hardness J is a JIS hardness of rubber constituting the lateral rubber layer.

TABLE 1

|  | Conventional tire | Tires of Examples | | | | |
|---|---|---|---|---|---|---|
|  |  | 1 | 2 | 3 | 4 | 5 |
| Width Wp | 190 | same as in the left | same as in the left | same as in the left | same as in the left | same as in the left |
| Belt ply width | 240/220 | 240/120 | same as in the left | same as in the left | 120/240 | same as in the left |
| Inclination angle A | 22/22 | 52/52 | same as in the left | same as in the left | same as in the left | same as in the left |
| Gauge E | — | — | 1.2 | same as in the left | 2.5 | 4.5 |
| Gauge ratio G/T | 1 | same as in the left | 2.85 | same as in the left | 4.85 | 7.92 |
| Hardness H | — | — | 70 | same as in the left | same as in the left | same as in the left |
| Distance L | — | — | 60 | 0 | 60 | same as in the left |
| Distance M | — | — | 110 | same as in the left | same as in the left | same as in the left |
| Hardness J | 76 | same as in the left | same as in the left | same as in the left | same as in the left | same as in the left |
| Running index | 100 | 118 | 135 | 135 | 142 | 147 |
| Displacement index | — | 92 | 92 | 93 | 92 | 94 |
| Trouble place | end of belt reinforcing layer | same as in the left | same as in the left | same as in the left | same as in the left | same as in the left |

|  | Tires of Examples | | | | | |
|---|---|---|---|---|---|---|
|  | 6 | 7 | 8 | 9 | 10 | 11 |
| Width Wp | 190 | 210 | 190 | same as in the left | same as in the left | same as in the left |
| Belt ply width | 120/240 | 120/250 | 240/150 | 240/160 | 240/170 | 240/120 |
| Inclination angle A | 52/52 | same as in the left | same as in the left | same as in the left | same as in the left | same as in the left |
| Gauge E | 2.5 | same as in the left | 1.2 | same as in the left | same as in the left | same as in the left |
| Gauge ratio G/T | 4.85 | same as in the left | 2.85 | same as in the left | same as in the left | same as in the left |
| Hardness H | 57 | 70 | same as in the left | same as in the left | same as in the left | 52 |
| Distance L | 60 | same as in the left | same as in the left | same as in the left | same as in the left | same as in the left |
| Distance M | 110 | 115 | 110 | same as in the left | same as in the left | same as in the left |

TABLE 1-continued

| Hardness J | 76 | same as in the left | same as in the left | same as in the left | same as in the left | same as in the left |
|---|---|---|---|---|---|---|
| Running index | 153 | 134 | 129 | 116 | 111 | 112 |
| Displacement index | 93 | 92 | 93 | 94 | 98 | 94 |
| Trouble place | end of belt reinforcing layer | same as in the left | same as in the left | same as in the left | same as in the left | separation in cushion rubber layer |

TABLE 2

| | Tires of Examples | | | | | | | | | |
|---|---|---|---|---|---|---|---|---|---|---|
| | 12 | 13 | 14 | 15 | 16 | 17 | 18 | 19 | 20 | 21 |
| Width Wp | 190 | same as in the left | same as in the left | same as in the left | same as in the left | same as in the left | 190 | same as in the left | same as in the left | same as in the left |
| Belt ply width | 240/120 | same as in the left | same as in the left | 120/240 | same as in the left | same as in the left | 240/120 | same as in the left | same as in the left | same as in the left |
| Inclination angle A | 52/52 | same as in the left | same as in the left | same as in the left | same as in the left | same as in the left | 35/35 | 38/38 | 40/40 | 45/45 |
| Gauge E | 1.2 | same as in the left | same as in the left | 0.5 | 0.7 | 6.0 | 1.2 | same as in the left | same as in the left | same as in the left |
| Gauge ratio G/T | 2.85 | same as in the left | same as in the left | 1.77 | 2.08 | 10.23 | 2.85 | same as in the left | same as in the left | same as in the left |
| Hardness H | 80 | 82 | 70 | same as in the left | same as in the left | same as in the left | 70 | same as in the left | same as in the left | same as in the left |
| Distance L | 60 | same as in the left | same as in the left | same as in the left | same as in the left | same as in the left | 60 | same as in the left | same as in the left | same as in the left |
| Distance M | 110 | same as in the left | same as in the left | same as in the left | same as in the left | same as in the left | 110 | same as in the left | same as in the left | same as in the left |
| Hardness J | 76 | same as in the left | 58 | 76 | same as in the left | same as in the left | 76 | same as in the left | same as in the left | same as in the left |
| Running index | 118 | 108 | 117 | 118 | 133 | 105 | 110 | 119 | 126 | 129 |
| Displacement index | 91 | 91 | 92 | 92 | 92 | 94 | 118 | 108 | 100 | 96 |
| Trouble place | end of belt reinforcing layer | same as in the left | end of widest-width belt | end of belt reinforcing layer | same as in the left | air blister in cushion rubber layer | end of belt reinforcing layer | same as in the left | same as in the left | same as in the left |

Then, each of the above tires is mounted onto a rim having a size of 9.00×22.5 and inflated under an internal pressure of 900 KPa and thereafter run on a drum at a speed of 60 km while applying a load of 40.0 kN until troubles such as separation failure and the like are caused. The results are shown in a column of "running index" of Tables 1 and 2 on the basis that the conventional tire is 100. In this case, the index of 100 is 17,500 km. Also, a displacement quantity between the belt layer and the belt reinforcing layer at a position separated from the ground contact region of each tire by 60 degrees in the circumferential direction is determined by simulation and the result is shown by an index on the basis that Example 20 in which the inclination angle of the reinforcing element in the belt ply with respect to the tire equator is 40 degrees is 100.

INDUSTRIAL APPLICABILITY

As mentioned above, according to the invention, the belt durability can be improved by effectively suppressing the interlayer separation between the each widthwise outer end portion of the belt reinforcing layer and the belt layer.

The invention claimed is:

1. A pneumatic radial tire comprising a carcass layer toroidally extending between a pair of bead portions, a belt layer arranged on a radially outer side of the carcass layer and comprised of at least two belt plies embedded with reinforcing elements inclining in opposite directions with respect to an equator of the tire, and a belt reinforcing layer arranged between the carcass layer and the belt layer and comprised of at least one reinforcing ply embedded with reinforcing elements extending substantially in a circumferential direction, provided that a width Wp of a widest-width reinforcing ply among the reinforcing plies is 0.6 times or more a tire width W, in which only a widest-width belt ply among the belt plies is arranged so as to locate each widthwise outer end thereof outward from each widthwise outer end of the widest-width reinforcing ply in the widthwise direction, and a width Wn of the remaining belt ply(s) having a width narrower than that of the widest-width belt ply is within a range of 0.2-0.8 times a width Wp of the widest-width belt reinforcing ply.

2. A pneumatic radial tire according to claim 1, wherein an inclination angle of the reinforcing element embedded in the belt ply with respect to the equator of the tire is within a range of 40-60 degrees in all belt plies.

3. A pneumatic radial tire according to claim 1, wherein a cushion rubber layer is interposed at least between the each widthwise outer end portion of the widest-width reinforcing ply and a portion of the belt ply overlapped therewith.

4. A pneumatic radial tire according to claim 3, wherein when a total gauge of coating rubbers mutually opposed to each other in the mutually adjoining reinforcing ply and belt ply is T, a rubber gauge G including the total gauge T between the each widthwise outer end portion of the widest-width reinforcing ply and the portion of the belt ply overlapped therewith including the cushion rubber layer interposed therebetween is rendered into a range of 2-10 times the total gauge T.

5. A pneumatic radial tire according to claim 3, wherein the cushion rubber layer is made of rubber having a JIS hardness equal to or less than the JIS hard-ness of the coating rubber for the belt plies.

6. A pneumatic radial tire according to claim 5, wherein the cushion rubber layer is made of rubber having a JIS hardness of 55-80.

7. A pneumatic radial tire according to claim 3, wherein the widthwise outer end of the cushion rubber layer is located inward from the each widthwise outer end of the widest-width belt ply in the widthwise direction.

8. A pneumatic radial tire according to claim 1, wherein a lateral rubber layer made of rubber having a JIS hardness equal to or more than the JIS hardness of the coating rubber for the reinforcing ply(s) is arranged at each widthwise outside of the widest-width reinforcing ply.

9. A pneumatic radial tire according to claim 8, wherein the widthwise outer end of the lateral rubber layer is extended outward from the widthwise outer end of the widest-width belt ply in the widthwise direction.

10. A pneumatic radial tire according to claim 8, wherein a cushion rubber layer is interposed at least between the each widthwise outer end portion of the widest-width reinforcing ply and a portion of the belt ply overlapped therewith, and
wherein the lateral rubber layer is made of rubber having a JIS hardness higher than that of the cushion rubber layer.

11. A pneumatic radial tire according to claim 1, wherein the widest-width belt ply is arranged adjacent to the belt reinforcing layer.

12. A pneumatic radial tire according to claim 1, wherein at least one belt ply is arranged between the widest-width belt ply and the belt reinforcing layer.

13. A pneumatic radial tire comprising a carcass layer toroidally extending between a pair of bead portions, a belt layer arranged on a radially outer side of the carcass layer and comprised of at least two belt plies embedded with reinforcing elements inclining in opposite directions with respect to an equator of the tire, and a belt reinforcing layer arranged between the carcass layer and the belt layer and comprised of at least one reinforcing ply embedded with reinforcing elements extending substantially in a circumferential direction, provided that a width Wp of a widest-width reinforcing ply among the reinforcing plies is 0.6 times or more a tire width W, in which only a widest-width belt ply among the belt plies is arranged so as to locate each widthwise outer end thereof outward from each widthwise outer end of the widest-width reinforcing ply in the widthwise direction, and a cushion rubber layer is interposed at least between the each widthwise outer end portion of the widest-width reinforcing ply and a portion of the widest-width belt ply overlapped therewith, and the widthwise outer end of the cushion rubber layer is located inward from the each widthwise outer end of the widest-width belt ply in the widthwise direction, and when a total gauge of coating rubbers mutually opposed to each other in the mutually adjoining reinforcing ply and belt ply is T, a rubber gauge G including the total gauge T between the each widthwise outer end portion of the widest-width reinforcing ply and the portion of the belt ply overlapped therewith including the cushion rubber layer interposed therebetween is rendered into a range of 2-10 times the total gauge T,
wherein a lateral rubber layer made of rubber having a JIS hardness equal to or more than the JIS hardness of the coating rubber for the reinforcing ply(s) is arranged at each widthwise outside of the widest-width reinforcing ply.

* * * * *